March 28, 1961 H. C. GOODRICH 2,977,411
AUTOMATIC GAIN CONTROL CIRCUITS
Original Filed Aug. 19, 1953
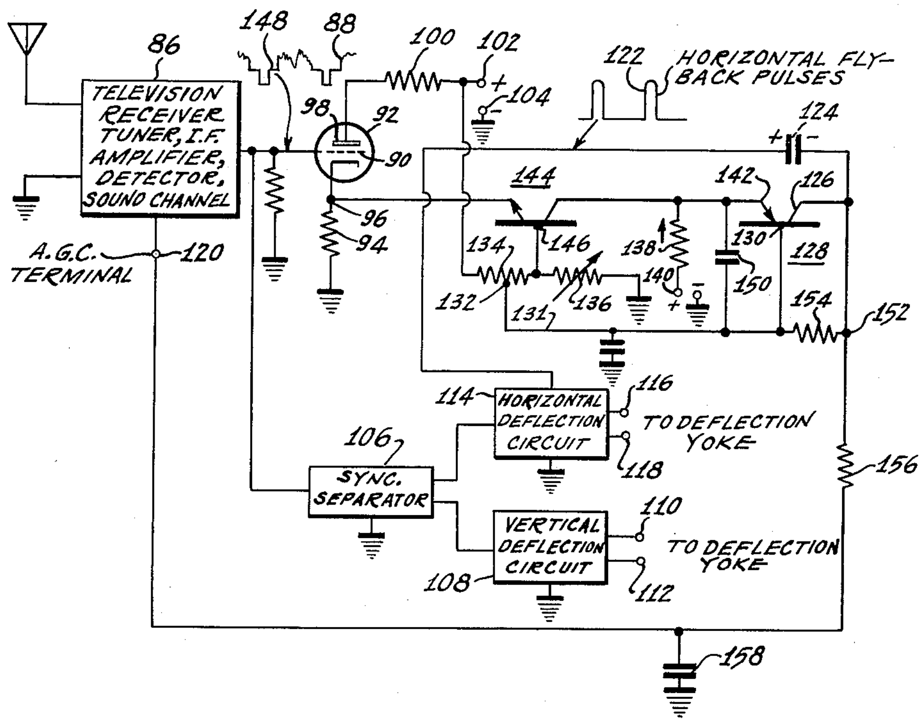
INVENTOR.
HUNTER C. GOODRICH
BY
ATTORNEY United States Patent Office 2,977,411

Patented Mar. 28, 1961

2,977,411

AUTOMATIC GAIN CONTROL CIRCUITS

Hunter C. Goodrich, Collingswood, N.J., assignor to Radio Corporation of America, a corporation of Delaware Original application Aug. 19, 1953, Ser. No. 375,248, now Patent No. 2,855,559, dated Oct. 7, 1958. Divided and this application Feb. 1, 1957, Ser. No. 637,699

3 Claims. (Cl. 178—7.3)

The present invention relates to improvements in automatic gain control circuits, especially of the type useful for the automatic control of the sensitivity of television receivers. The present application is a division of application Serial No. 375,248, filed August 19, 1953, entitled "Voltage Rectifying Systems," issued as U.S. Patent No. 2,855,559 on October 7, 1958.

More directly, the present invention relates to an improved automatic gain control circuit employing semiconductor type amplifier devices.

In one form of automatic gain control circuit with which the present invention is concerned, the amplitude of the received radio signal is utilized to control the rectification of an alternating current wehreby to produce a direct current potential whose value is rendered a function of the received signal strength. The resulting voltage is, therefore, suitable as an automatic gain control potential. In general, the controlled rectification system of automatic gain control is most commonly found in present day television receivers. In many such receivers an alternating current voltage component of the cathode ray beam deflection waveform is rectified to produce an automatic gain control potential having a negative polarity with respect to circuit ground. The rectification of this component, commonly referred to as "deflection flyback" pulse, is in turn controlled in accordance with the peak value of received video signal whereby to render the resulting unidirectional potential suitable for direct use as an automatic gain control voltage.

The present invention provides a novel voltage rectifying circuit for embodiment in an automatic gain control circuit in which the unidirectional potential storage circuit is subjected to charging by alternate opposite polarity excursions of the alternating current waveform about its alternating current axis. In accordance with the present invention, the unidirectional potential storage circuit is subjected to charging by one polarity excursion on an uncontrolled basis while subjected to charging (relative discharging) by opposite polarity excursions on a controlled basis.

In the utilization of semiconductor amplifying devices according to the present invention, novel advantage is taken of the bidirectional properties of collector circuit conductivity in a transistor device when the base-emitter circuit is forwardly biased. By employing collector circuit forward conductivity for voltage rectifying purposes, reverse collector conductivity may be used as a voltage control means under the control of emitter-base current.

It is, therefore, an object of the present invention to provide a simple yet effective automatic gain control circuit for use in radio receiving systems.

It is another object of the present invention to provide an improved automatic gain control circuit utilizing semiconductor amplifier devices for television receivers.

A better understanding of the novel operating principles underlying the improvements offered by the present invention, as well as a better insight as to its advantages will be obtained from a reading of the following specification, especially when taken in connection with the accompanying drawing, in which is shown a combination block and schematic representation of a television receiving system illustrating an embodiment of the present invention as a transistorized automatic gain control circuit.

Turning now to the drawing, the conventional components including a tuner, intermediate frequency amplifier, detector and sound channel of a television receiver are indicated by the block 86. The demodulated video signal 88 appearing in the output circuit of the block 86 is indicated as being connected to the control electrode 90 of a cathode follower stage embracing vacuum tube 92. A low impedance source of video signal will, therefore, be established across the cathode follower load resistor 94 connected in the cathode circuit of the vacuum tube 92. The upper extremity 96 of the resistor 94 will, of course, be at some net positive potential with respect to circuit ground, since the anode 98 is connected through a load resistor 100 to a source of power supply potential having a positive terminal at 102 and a negative terminal at 104. Demodulated video signal 88 is also applied to the input circuit of a sync separator circuit 106. The separated vertical synchronizing signal provided by the sync separator circuit 106 is conventionally applied to a vertical deflection circuit 108 for control thereof. Vertical deflection circuit output terminals 110 and 112 are indicated for connection to the vertical deflection coil of a cathode ray beam deflection yoke. Correspondingly, separated horizontal synchronizing signal provided by the sync separator circuit 106 is applied to the horizontal deflection circuit 114 in turn designated to drive the horizontal deflection coil winding indicated for connection to the output terminals 116 and 118.

In accordance with the embodiment of the present invention illustrated, automatic gain control potential for application to the automatic gain control terminal 120 of the receiver is developed by conrolled rectification of the horizontal flyback pulses 122 derived in any well known manner from the horizontal deflection circuit 114. The horizontal flyback pulses which occur during the period between the end of one television line and the beginning of the next television line are coupled by a storage capacitor 124 to the collector 126 of transistor device 128. The base 130 of the transistor device 128 is connected via circuit 131 to a point of positive potential 132 along the bleeder network comprising resistor 134 and resistor 136. The network 134 and 136 is connected from the positive power supply terminal 102 to circuit ground. A resistor 138 is in turn connected from a source of positive potential having a terminal at 140 to the emitter 142 of the transistor device 128 so as to apply a forward bias between the emitter and base. By way of example, the transistor device 128 is illustrated as a P–N–P junction transistor wherein for transitsor action the emitter 142 should be established at a positive potential relative to the base 130 for forward bias current to flow.

An amplifying device in the form of another transistor 144 is connected between the source of low impedance video signal across resistor 94 and the emitter 142 of transistor device 128. It is noted that the base 146 of the transistor 144 is connected at a point along the bleeder network 134—136 which is more negative than the upper extremity 96 of the cathode resistor 94 whereby to apply a reverse bias to the transistor 144 which is illustrated as an N–P–N transistor. By adjusting the value of element 136 of the bleeder network a net base-emitter reverse bias voltage can be established at a value which will permit a forward bias condition between the emitter and base of the transistor 144 to occur only at signal levels in excess of the blanking level 148 of the video signal 88. Since the collector to base bias voltage for the transistor 144 is reverse by merit of the resistor 138 being connected to a source of potential 140 adequately more positive than the base 146, current flow through the resistor 138 will correspond to clipped synchronizing signal. Capacitor 150 connected in shunt with the resistor 138 is of a value so as to form a time constant with resistor 138 sufficiently longer than the recurrence period of the synchronizing signal so that the voltage at the upper extremity of resistor 138 will represent average sync height. This average sync height, as is well known in the television art, is a function of the received signal strength of a negative modulated television signal, as is standard in the United States. It is, therefore, seen that the base-emitter bias current on the transistor 128 will be a direct function of signal strength.

In the operation of the automatic gain control circuit illustrated in the drawing, the horizontal flyback pulses 122 will produce charging of the storage capacitor 124. The flyback pulse 122 extending in a positive going direction will establish forward bias current between the collector and base of the transistor 128 thereby causing charging of the capacitor 124 with the polarity shown. During intervals between the flyback pulses 122, the average potential on the collector 126 relative to circuit ground, will become negative. During this period conductance from collector to emitter in the transistor 128 will be of a value conditioned by base-emitter bias current previously established as a function of signal strength. Thus, the capacitor 124 will effectively be discharged as a direct function of signal strength such that the potential at the right hand terminal 152 of the collector-base load resistor 154 will display a negative potential with respect to circuit ground whose arithmetical value will be directly proportional to received signal strength. The pulse component of the voltage terminal 152 will be filtered out by means of a filter network comprising resistor 156 and capacitor 158 and the resulting voltage applied to automatic gain control terminal 120 of the receiver.

Thus, in the operation of the embodiment shown, should the incoming signal increase in amplitude greater average current will pass through the collector load resistor 138 of transistor 144. This will reduce the net base-emitter bias current on transistor 128 which in turn increases the collector-emitter path resistance during intervals between horizontal flyback pulses 122. This in turn means that the capacitor 124 will be discharged to a lesser extent during the intervals between flyback pulses which will result in a higher negative AGC potential on terminal 120 to reduce the gain of the receiver in compensation of the initial increase in signal strength.

The cathode follower stage 92 has been illustrated as a vacuum tube but may well be replaced by a suitable transistor circuitry. Correspondingly, the elements in the blocks 86, 106, 108 and 114 may, in accordance with an article entitled "The Study of Transistor Circuits for Television" by G. C. Sziklai, R. D. Lohman and G. B. Herzog, appearing on pp. 708–717 of the "Proceedings of the I.R.E." for June 1953, be entirely made up of suitable transistor device circuits.

What is claimed is:

1. In an automatic gain control circuit for a radio signal receiving system, the combination of: an amplifier designated to communicate incoming radio signals; voltage responsive gain control means connected with said amplifier for controlling the gain thereof in accordance with an automatic gain control potential; means coupled with said amplifier for developing a direct current indicating potential whose magnitude represents the amplitude of received radio signal; a source of periodically recurrent alternating pulsed voltage; a semiconductor amplifying device having emitter, base and collector electrodes; a resistance path means connected between said collector and said base to form a collector-base circuit; a storage capacitor connected from said source of alternating pulsed voltage to said collector electrode; means for applying said direct current indicating potential between said emitter and base with such polarity as to result in a forward base-emitter bias on said semiconductor amplifier device of a magnitude related to received signal strength; and direct current conducting low-pass filter means connected from a point in said collector-base circuit to said voltage responsive gain control means.

2. In an automatic gain control circuit, according to claim 1, wherein said radio receiving system is a television receiving system having a deflection output circuit, and wherein said means for developing indicating potential is responsive to received television synchronizing signal amplitude; and wherein said source of alternating pulsed voltage is the horizontal deflection output circuit of said television receiver.

3. In an automatic gain control circuit for a television receiver, the combination of: a signal amplifier designated to communicate received television signal; voltage responsive gain control means connected with said amplifier for controlling the gain thereof in accordance with an automatic gain control potential; a first semiconductor amplifying device having emitter, base and collector electrodes; a second semiconductor device having emitter, base and collector electrodes; impedance means connected between said emitter and base electrodes of said first device to form a base-emitter circuit; reverse bias means of predetermined magnitude included in said first device base-emitter circuit; means coupled with said amplifier for applying received video signal to said first device emitter-base circuit with a synchronizing signal polarity tending to produce forward conduction in said emitter-base circuit; reverse bias voltage means connected between said collector and base electrodes of said first device including a collector-base load resistance; a capacitor connected in shunt with said load resistance, the value of said capacitor being chosen relative to the value of said resistance to establish a time constant substantially longer than the recurrence rate of said synchronizing signals; means for connecting said capacitor also between the emitter and base electrodes of said second device such as to vary the forward base-emitter bias on said second device as a function of synchronizing signal amplitude; resistance means connected between said second device collector and base electrodes; a source of horizontal deflection flyback pulses included in said television receiver; a storage capacitor connected between said flyback pulse source and said second device collector electrode; and low-pass filter means connected between said second device collector electrode and said voltage responsive gain control means.

References Cited in the file of this patent

UNITED STATES PATENTS

| | | |
|---|---|---|
| 2,673,892 | Richman | Mar. 30, 1954 |
| 2,735,004 | Keizer et al. | Feb. 14, 1956 |